United States Patent

Udoh

[19]

[11] Patent Number: 5,967,788
[45] Date of Patent: Oct. 19, 1999

[54] TOY DEVICE FOR ILLUSTRATING MATHEMATICS

[76] Inventor: Justin P. Udoh, 3314 Russell Blvd. #8, St. Louis, Mo. 63104

[21] Appl. No.: 09/108,556

[22] Filed: Jul. 1, 1998

Related U.S. Application Data

[60] Provisional application No. 60/051,596, Jul. 2, 1997.

[51] Int. Cl.⁶ .................................................. G09B 23/04
[52] U.S. Cl. ........................................... 434/211; 428/136
[58] Field of Search .................................. 40/124.01, 360, 40/445, 603, 604; 273/157 R, 155; 428/7, 9, 136; 434/128, 211; 446/475, 486; D21/340

[56] References Cited

U.S. PATENT DOCUMENTS

| | | | |
|---|---|---|---|
| 237,026 | 1/1881 | Knauff | 428/7 |
| 2,633,440 | 3/1953 | Scholl | 428/40.1 |
| 3,706,173 | 12/1972 | Taylor | 52/717.03 |
| 4,262,059 | 4/1981 | Frankowski | 428/597 |
| 4,271,640 | 6/1981 | Gabois | 51/400 |
| 4,416,633 | 11/1983 | Gulack . | |
| 4,419,081 | 12/1983 | Steinmann . | |
| 4,504,234 | 3/1985 | Jarvis . | |
| 4,561,658 | 12/1985 | Peterson . | |
| 4,725,237 | 2/1988 | Tsai . | |
| 4,808,111 | 2/1989 | Pratt . | |
| 5,114,766 | 5/1992 | Jacques | 428/35.7 |
| 5,275,863 | 1/1994 | Hanson | 428/136 |
| 5,316,811 | 5/1994 | Focke | 428/43 |
| 5,330,811 | 7/1994 | Buchalter | 428/40 |
| 5,667,871 | 9/1997 | Goodrich | 428/136 |
| 5,705,252 | 1/1998 | Lea | 428/133 |
| 5,725,931 | 3/1998 | Landin | 428/134 |

*Primary Examiner*—Robert A. Hafer
*Assistant Examiner*—Kurt Fernstrom
*Attorney, Agent, or Firm*—Haverstock, Garrett & Roberts

[57] ABSTRACT

The present invention relates to a toy device designed for illustrating mathematical concepts, with the toy device made from any of a variety of flexible materials. The toy device will have at least one outer edge and at least one inner edge, as well as, two cuts, so that when the toy device is played with by a child, various mathematical concepts can be illustrated.

8 Claims, 2 Drawing Sheets

5,967,788

TOY DEVICE FOR ILLUSTRATING MATHEMATICS

This application claims the benefit of U.S. Provisional Application No. 60/051,596 filed Jul. 2, 1997.

FIELD OF THE INVENTION

The present device relates to a toy used to entertain and to illustrate mathematical concepts.

BACKGROUND OF THE INVENTION

Mathematics can be a difficult subject to teach children, as the material is rather abstract and difficult to understand. In particular, concepts such as lines, squares, and tangents can be abstract and not easily understood by children. Additionally, mathematical concepts such as length, width, parameter, area, circumference, radius, diameter, and parallel segments are not easily understood by children. Therefore, it would be desirable to have a device which would be useful in teaching children different mathematical concepts.

Toys are entertaining devices and games which provide pleasure to children and adults. In particular, children often play with toys for entertainment, but can also learn from such play activities. As such, it would be desirable to have a toy which could be educational, and in particular teach children and adults mathematical concepts while providing them with pleasure and entertainment.

SUMMARY OF THE INVENTION

The present invention relates to a toy device designed to motivate children, pre-school age through the middle school age, to study mathematics, by illustrating the utility of mathematics in a toy. The invention can also be used to teach adults mathematical concepts. Also, the present invention can be used to establish a relationship between mathematics subjects taught in a classroom and an object that may make a child happy, such as a toy.

The present device is desirable because it can be used to teach mathematics and can be used as a toy to entertain children. The toy device is especially entertaining to children because it can be worn on a subject's head similar to a toy crown or can be used as a decoration. In the process of using the device as a toy, mathematical concepts can be illustrated.

The toy device can be used to illustrate mathematical concepts such as length, width, perimeter, area, point, segment, ray, circumference, radius, diameter, and parallel segments. Also, the design of the present toy device involves the fractionization of a whole into parts, as the toy device contains multiple subunits which form the whole toy device. Thus, the toy device is desirable because it can be used to teach fractions. Skills relating to the fractionization of a whole into parts involve not only simple fractions in math, but are needed for solving math problems in linear algebra and linear programming. Thus, the present toy device is used to entertain children and to beneficially illustrate mathematical concepts.

The toy device can be made from flexible, cuttable material, which can be colored, such as construction paper, flexible plastic, laminated card board, coated foam, and other similar types of materials. It is important that the present toy device be cuttable and flexible so that the present device can be cut into connected segments and unfolded to be placed around a subject's head. Also, the ability to cut the material is beneficial because this is part of the way that mathematical concepts, such as segments and rays, are illustrated. Most preferably, the present device is made from construction paper, which comes in a variety of colors, and can be easily cut and stretched. The term stretched means to unfold or open so that the toy device is expanded to fit around another object. The construction of the toy device will have at least one outer edge and two or more cuts, one of which will extend from the outer edge to an inner portion of the device. Preferably, the toy device has at least one outer edge and at least one inner edge so that a device is formed having a cutout within the interior of the outer edge. The cutout will potentially allow the toy device to be slipped over a child's head. Also, it is preferred for the toy device to have at least two cuts which stop at points located between the outer edge and the inner edge.

DETAILED DESCRIPTION

Figure 2:
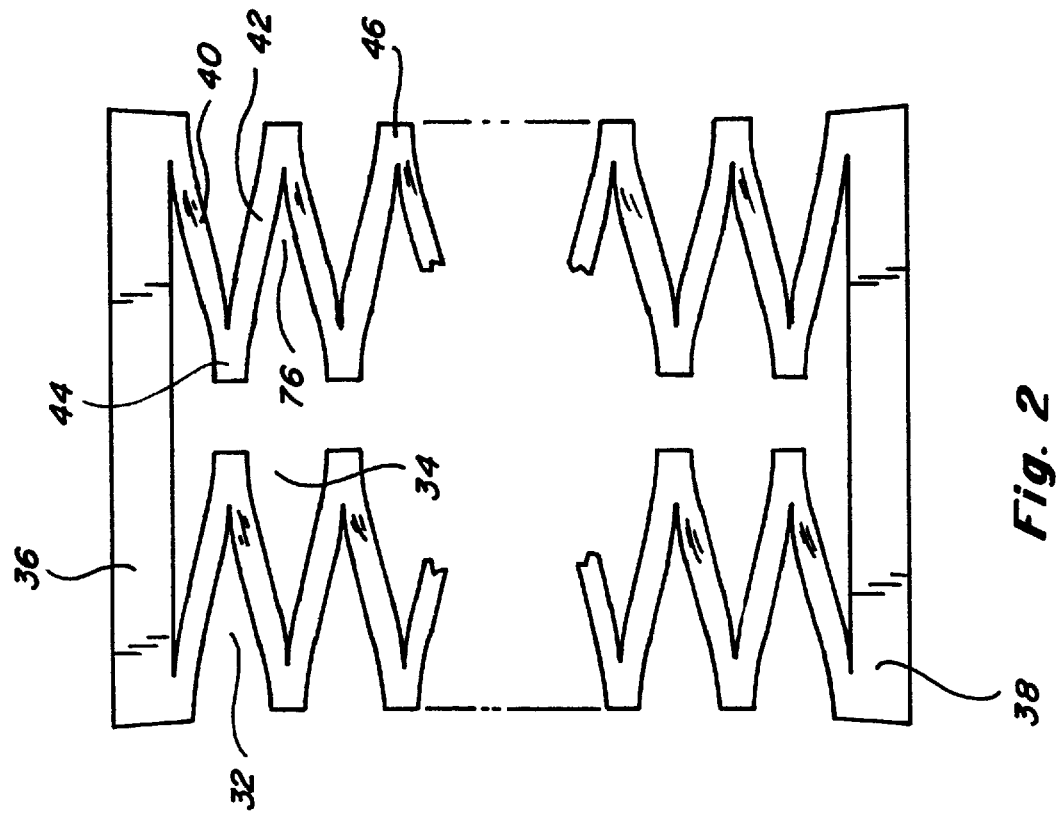
FIG. 2 shows the device of FIG. 1 unfolded.
Figure 1:
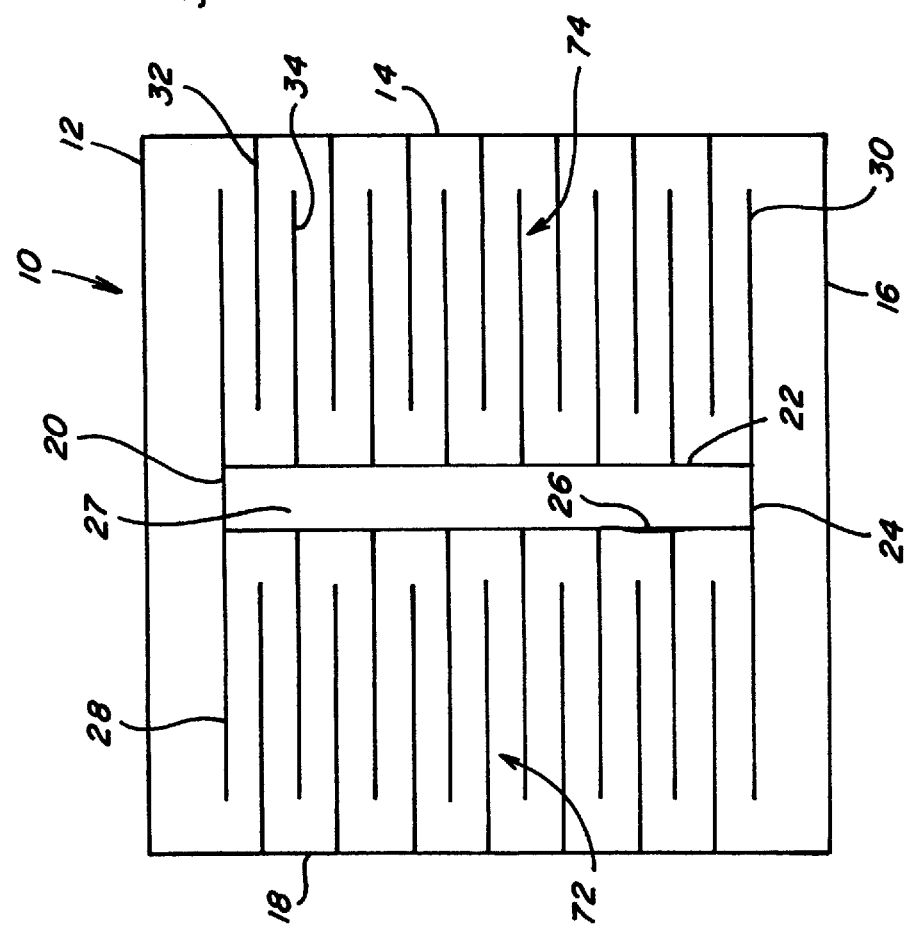
FIG. 1 shows a device having four outer edges and four inner edges prior to unfolding the device.
Figure 4:
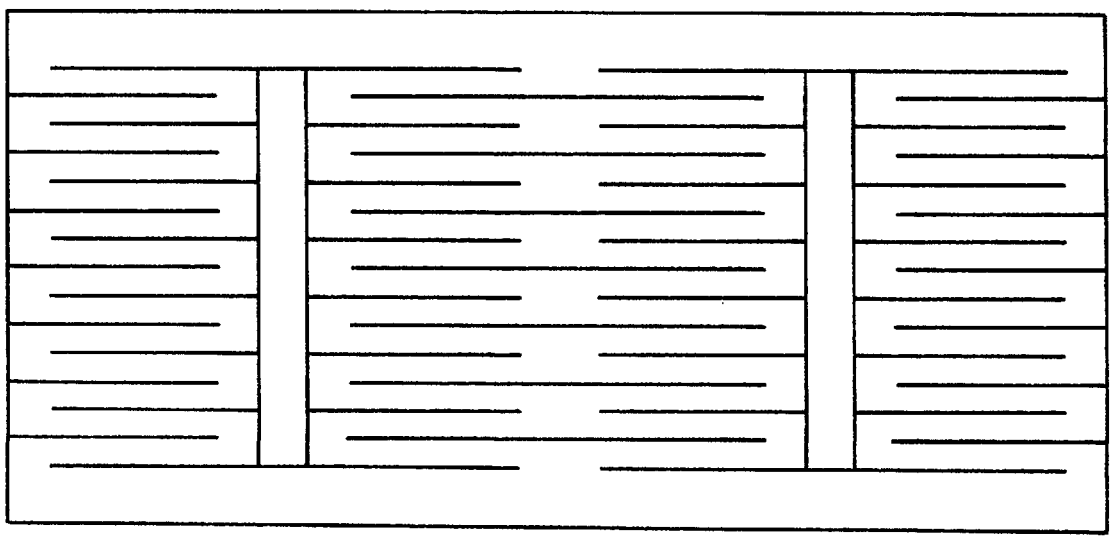

The present invention is a toy device 10 which is used to entertain children and illustrate mathematical concepts. The toy device 10 which is pictured in FIGS. 1, 2, and 4, is advantageous because it does not require the use of any adhesives, including glue, to manufacture the device. Furthermore, the present invention does not require taping, stapling, fastening, or any other means for holding the toy device together. The toy device teaches specific mathematical concepts such as length, width, perimeter, area, point, segment, ray, circumference, radius, diameter, and parallel segments.

The preferred construction of the toy device is shown in FIG. 1, with the toy device 10 having outer edges 12, 14, 16, and 18, and inner edges 20,22, 24, and 26. Outer edges 12 and 16 are opposite one another and substantially perpendicular to edges 14 and 18 which are opposite one another. Inner edges 20 and 24 are opposite one another and substantially perpendicular to edges 22 and 26 which are opposite one another. The inner edges form a substantially rectangular cutout 27. Additionally, the preferred construction of the toy device 10 has two spaced apart substantially parallel cuts 28 and 30, which, with outer edges 12 and 16, form end pieces 36 and 38, shown in FIG. 2. Importantly, there are a plurality of cuts exemplified by 32 and 34 in FIG. 1, which are located between cuts 28 and 30. The plurality of cuts 32 and 34 start at points located on either the inner edges 22 and 26, or the outer edges 14 and 18. The cuts 32 and 34 preferably are staggered so that the starting point for the cuts alter between starting at the inner edge and the outer edge, as shown in FIG. 1. Also, as shown, the cuts terminate at a point located between the inner edge and the outer edge. At least two cuts 32 and 34 are required, however, it is preferred to have a plurality of cuts because this will allow the toy device 10 to more readily unfold thereby allowing for easier placement over a subject's head. Also, more cuts 32 and 34 can be used to illustrate more complex mathematical concepts related to fractions. The end pieces 36 and 38 are more clearly shown in FIG. 2, with the end pieces formed by outer edges 12 and 16 and cuts 28 and 30. When the end pieces 36 and 38 are gripped by a user and pulled away from one another the plurality of cuts, including cuts 32 and 34, are separated or unfolded to form the toy device depicted in FIG. 2. The separated cuts expand to form spaces. The spaces are important because this allows for the easier illustration of certain mathematical concepts and also allows for easier placement on a subject's head. As shown in FIG. 2, segments 40 and 42 are formed with end points 44 and 46. Because the device can be unfolded, as shown in FIG. 2, the device can be further stretched and placed around a subject's head to form a toy crown like object or can be attached to a ceiling or wall and hung similar to a streamer. Finally, inner edges 20, 22, 24, and 26 essentially divide the toy device into two parallel segments 72 and 74, with each of the segments having a plurality of cuts.

Figure 3:
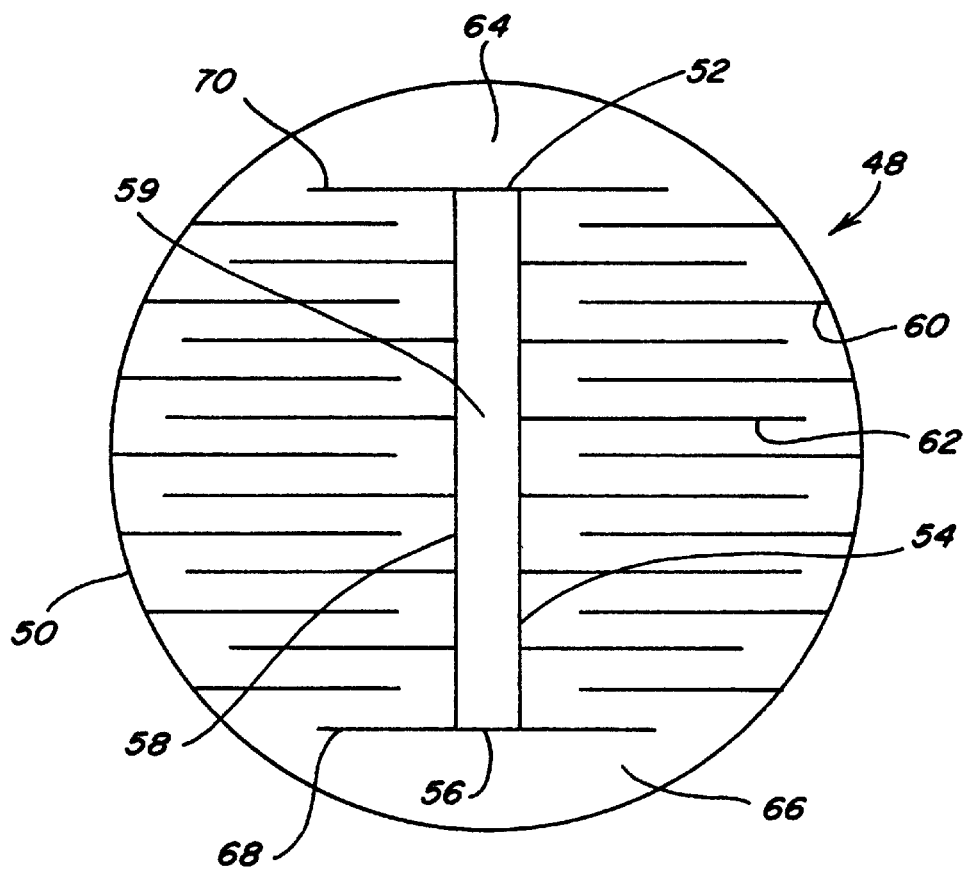
FIG. 3 shows a device having only one outer edge and four inner edges prior to unfolding the device; and, FIG. 4 shows a variation of the toy device having two inner cutouts.

FIG. 3 shows a toy device 48 which has a slightly different construction than the toy device 10 depicted in FIGS. 1 and 2. The toy device 48, has one circular outer edge 50 and inner edges 52, 54, 56, and 58, with edges 52 and 56 being opposite one another and substantially perpendicular to edges 58 and 54 which are opposite one another. The inner edges 52, 54, 56, and 58 form a substantially rectangular cutout 59, as shown in FIG. 3. Other designs can be used to form the cutout 59 located within the interior of the outer edge. For example, a circular inner edge can be used, which will mean the toy device 48 has only one inner edge and one outer edge. Thus, the number of inner edges in toy device 48 can vary with the desired construction. The toy device 48, also like the toy device 10, has at least two cuts exemplified by number 60 and 62 and preferably a plurality of cuts. Preferably, the cuts 60 and 62 include outer edge cuts, which emanate from the outer edge and inner edge cuts which emanate from the inner edge. More preferably, the inner edge cuts and outer edge cuts are staggered so that the inner edge cuts and outer edge cuts alternate, as shown in FIG. 3. Also, it is preferred for the cuts 60 and 62 to be substantially parallel. Regardless of where the cuts emanate from they will terminate at a point located between the outer edge and the inner edge. The toy device, as shown in FIG. 3, also has end portions 64 and 66, which when pulled away from one another will cause the cuts 60 and 62, for example, to widen similar to the device shown in FIG. 2. The end pieces 64 and 66 are formed by cuts 68 and 70 and the outer edge 50.

The invention, as mentioned, can be used to demonstrate to a user what a segment 40 and 42 is, as shown in FIG. 2. The invention also includes, for example, cuts 32, 34, 60, and 62 which demonstrate broken rays. As part of this invention, the segments 40 and 42 of more than one toy device can be paired up and used together.

The present invention can have a variety of shapes and dimensions including circular, square, rectangular, triangular, octagonal, as well as other shapes. The most preferred device is made from a piece of flat construction paper and has a dimension of approximately three (3) inches square or approximately 76 millimeters (mm) by 76 mm. An example of suitable construction paper used in the present invention is an Astorbrights Fluorescent Pad manufactured by Wausau Papers, Inc., Brokaw, Wis. The pads are desirable because they provide for a colorful and exciting appearance in the device. Multiple devices can be made by combining pads with different colors, so as to have a set or bundle of colorful toy devices suitable for a variety of uses. In addition to preferably being three inches square, the toy device will preferably have a total of 30 cuts which are approximately 1 inch long and a cutout, such as 27 or 59, approximately 2.5 inches long and 0.25 inches wide.

To make the device, a model can be placed over a square piece of construction paper according to the specifications just discussed in the proceeding paragraphs. Once the model is placed over the pad, the pad is cut according to the model to form the device. An insulated razor blade, scissors, or straight edge, for example, can be used. The more preferred method for making the device involves using a die cutter to cut multiple devices simultaneously.

The toy device can have a variety of constructions, the most preferred construction is a square device which has the dimension three (3) inches by three (3) inches, however other dimensions may be used. The preferred toy device for illustrating mathematical concepts is made from an elastic material, that can be cut, is available in a variety of colors, and can be unfolded. Preferably said elastic material is selected from the group consisting of construction paper, paper, cardboard, plastic sheet, coated foam, laminated cardboard, and combinations thereof; with said toy device having at least two edges, including at least one outer edge and at least one inner edge. Also, the toy device will have at least two cuts, with at least one cut extending from the outer edge and at least one extending from the inner edge. All of the cuts will extend to a point located between the outer edge and the inner edge. Preferably, the cuts are substantially parallel to one another. Also, the toy device will preferably have a cutout formed by at least one inner edge. Most preferably, the cutout has a substantially rectangular shape. Again, the cutout results in the toy device appearing to have two parallel segments 72 and 74.

The device is used by folding the device along the cutout, so that the parallel segments overlay one another. It is important to note that the device does not have an "outside" portion as opposed to having "inside" portion. Thus, the device can be folded either way. It is important to fold the device along the window or cutout. The end portions provide areas for holding the device in a folded position. The device is then used by holding the end portions and gradually pulling them sideways so that the cuts are expanded.

Generally, segments 40 and 42 are pulled apart so that cuts 32 and 34, for example, are expanded. However, it is also important to note that between any two given segments there is a point of contact. This point of contact is called a tangle 76, shown in FIG. 2.

Thus, there has been shown and described a novel toy device for entertaining and illustrating mathematics to children, which fulfills all the objects and advantages sought therefore. It would be apparent to those skilled in the art, however, that many changes, variations, modifications, and other uses and applications for the subject device are possible, and also such changes, variations, modifications, and other uses and applications which do not depart from the spirit and scope of the invention are deemed to be covered by the invention which is limited only by the claims which follow.

What is claimed is:

1. A toy device for illustrating mathematical concepts, wherein said toy device is made from a material that can be cut and is available in a variety of colors, with said toy device having at least two opposite outer edges, including at least one outer edge which is substantially straight when said toy device is in a free state, at least one inner edge disposed between said two opposite outer edges when said toy device is in said free state, and at least two cuts, with at least one cut extending from one of said outer edges to a point located between said one outer edge and said inner edge and at least one cut which extends from said inner edge to a point located between said inner edge and one of said outer edges, said cuts being substantially parallel when said toy device is in the free state and being separable for forming spaces, respectively, when said toy device is pulled transversely relative thereto to an expanded state.

2. The toy device of claim 1, wherein said material for forming said toy device is selected from the group consisting of construction paper, paper, cardboard, plastic sheet, coated foam, laminated cardboard, and combinations thereof.

3. The toy device of claim 1 wherein said outer edges from a substantially square device.

4. The toy device of claim 1, wherein said toy device has four inner edges.

5. The device of claim 4, wherein said inner edges form a cutout.

6. A toy device for teaching mathematical concepts, wherein said toy device is made from a material that can be cut and is available in a variety of colors, with said toy device having at least one outer edge extending therearound and a cutout located within said device formed by at least one inner edge, said toy device having a plurality of cuts which extend from said outer edge to a point located between said outer edge and said inner edge and a plurality of cuts which extend from said inner edge to a point located between said inner edge and said outer edge, said cuts being substantially parallel and being separable for forming spaces, respectively, when said toy device is pulled transversely relative thereto.

7. The toy device of claim 1, wherein said material for forming said toy device is selected from the group consisting of construction paper, paper, cardboard, plastic sheet, coated foam, laminated cardboard, and combinations thereof.

8. The toy device of claim 5 wherein said outer edges forms a circle so that said toy device is circular shaped.

\* \* \* \* \*

UNITED STATES PATENT AND TRADEMARK OFFICE
CERTIFICATE OF CORRECTION

PATENT NO.: 5,967,788

DATED: October 19, 1999

INVENTOR(S): Justin P. Udoh

It is certified that an error appears in the above-identified patent and that said Letters Patent is hereby corrected as shown below:

Col. 2, line 31, "FIGS. 1, 2 and 4" should be --FIGS. 1, 2, 3 and 4--.

Signed and Sealed this

Twenty-second Day of August, 2000

Attest:

Q. TODD DICKINSON

*Attesting Officer*     *Director of Patents and Trademarks*